H. M. Le Duc,
Anti-Friction Roller.

Nº 58,109.        Patented Sep. 18, 1866.

Witnesses        Inventor

UNITED STATES PATENT OFFICE.

HENRY M. LE DUC, OF WASHINGTON, DISTRICT OF COLUMBIA.

IMPROVED ANTI-FRICTION JOURNAL-BOX.

Specification forming part of Letters Patent No. 58,109, dated September 18, 1866.

*To all whom it may concern:*

Be it known that I, HENRY M. LE DUC, of the city and county of Washington, and District of Columbia, have made new and useful Improvements in Anti-Friction Journal-Boxes; and I do hereby declare the following to be a full, clear, and exact description of the nature, construction, and operation of the same, reference being had to the annexed drawings, which are made part of this specification, and in which—

Figure 1:
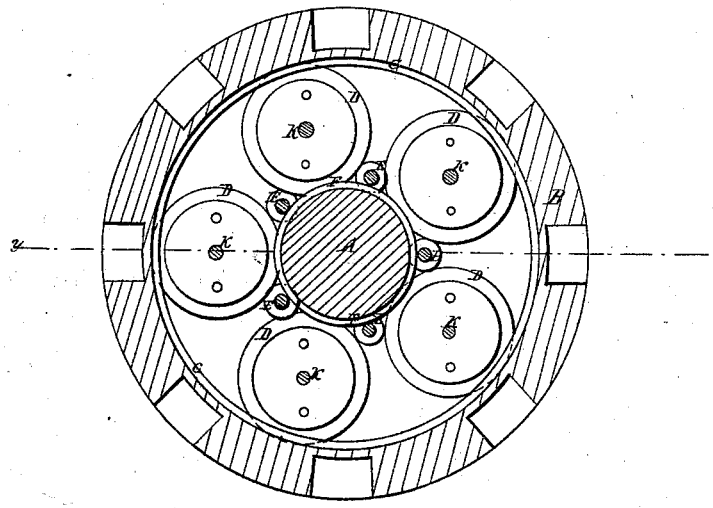
Figure 2:
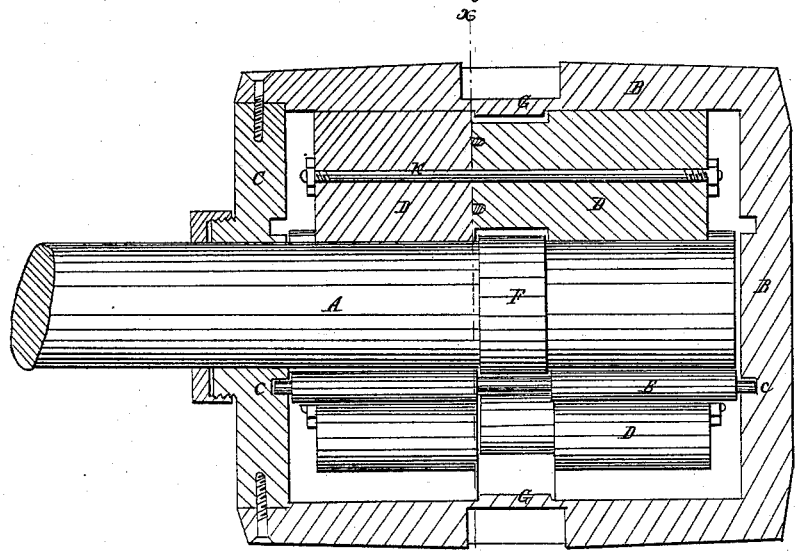

Figure 1 is a transverse sectional view of the journal-box on the line $x\,x$, Fig. 2. Fig. 2 is a longitudinal section on the line $y\,y$, Fig. 1.

The same letters refer to like parts in the different figures.

The object of the invention is to provide means for maintaining in their proper position longitudinally the circular series of anti-friction rollers, whose duty it is to remove friction by causing the axle or journal, as the case may be, to revolve against rotating surfaces, the contacting surfaces traveling in opposite direction at equal speed, and not slipping the one on the other.

To enable one skilled in the art to which my invention appertains to construct and use the same, I will proceed to describe it.

A is the axle or journal, the appropriateness of either name being determined by its use and connection. B is a box, with cap C, and around the journal are large rollers D and small rollers E, the former, D, in contact with the journal and with the inside periphery of the box B, while the smaller rollers, E, are disposed between the larger rollers for the purpose of keeping the latter apart, and are retained in their circle of revolution by means of the pressure of the larger rollers and their impingement on the inner shoulders or sides of the grooves $c\,c$ in the cap C and end of the box B, in which the small journal ends of the rollers E are confined.

F is an enlargement or belt upon the axle A, and G is a similar projection from the inside periphery of the box B. The object of the enlargement F is to keep the axle in its proper position longitudinally in reference to the rollers D—that is, to prevent its slipping out or in. The object of the projection G is to maintain the proper position of the rollers D relatively to the box B, in which they are inclosed, and prevent their ends from coming in contact with the box or cap.

I am aware that the planetary system of rollers retained in position by the smaller interposed rollers has been long known and is shown in many devices in the United States Patent Office; but the novelty of my invention consists in the arrangement for preserving the rollers and axle in their proper position longitudinally.

The larger rollers, D, as has been said, revolve in the annular space between the journal A and the interior periphery of the box B. They are therefore retained in their position radially by their impingement upon the surfaces of these parts. Their position in the circle of their revolution is maintained by the interposition of the smaller rollers, E, which are entirely comprised inside of the space bounded by the axes of the rollers D in their revolution. This gives the rollers E a determination inward toward the journal A as they are pressed by the rollers D. The effect of this inward pressure is to cause the journals $e$ of the rollers E to impinge upon the inner surfaces of the annular grooves $c\,c$. The necessity for their contact with this particular surface will be presently apparent.

The peripheries of the large roller and the small roller bear such a relative proportion to each other and to the surfaces on which they respectively (not mutually) impinge that the journal of the smaller roller, in impinging upon the side of the groove against which it rotates, will cause the smaller roller, without slipping, to perform its circuit around the axle in the same time that the larger roller, impinging against the inside periphery of the box, performs a like revolution.

A statement to explain the nature of their motion may be as follows: The large rollers in the annular space between the axle and the inside of the box impinge upon those two objects, and act as an anti-friction bearing. The necessity arises for something to separate them and make them retain their relative positions. Small rollers are introduced for this purpose, and now it becomes necessary to make such a relative proportion between the peripheries of the rollers, as between them.

selves and between them individually and the surfaces against which they respectively impinge, that they shall rotate without slipping.

To trace the action through from one immovable part to another, between which the motions follow in their due course, we will begin with the stationary surface or interior periphery of the box. Against this the surface of the large roller impinges, and in turn rotates the smaller roller, whose journal rotates against the inner side of the groove c, which is a fixed surface. The necessity of a certain relational proportion is here apparent, for were the proportion disturbed some of the moving surfaces must slip upon each other or against the fixed surfaces described.

It will be apparent, but may be stated, that, while the rollers D and E rotate in different directions, they revolve in the same direction, and, while the surfaces of the rollers D and E move at an even rate, the rollers rotate at a rate proportional to their diameters, the same proportion existing between the circular track b b and the inner side of the groove c.

It will be apparent that while these revolutions are occurring the rollers D will tend to rub against the ends of the cylindrical —— in which they move, unless provision be made for retaining them longitudinally. This is accomplished, as has been stated, by the projections G, and the axle maintained in longitudinal position by the enlargement F. This arrangement necessitates the division of the rollers D, each of which is made of two pieces, secured by a bolt, K, and the dowel-pins L.

In putting together, the portion of the roller D which has the waist or contraction is first placed in the box, and after the axle and other parts are in position the other portion of D is laid in and the bolts tightened.

I believe there can be no difficulty in understanding the operation of my invention; and, having thus described it,

What I claim therein as new, and desire to secure by Letters Patent, is—

The rims or projections G F within the hub or box and around the axle, respectively extending into annular grooves in the concentric series of larger rollers, to maintain them in position longitudinally, substantially as described.

HENRY M. LE DUC.

Witnesses:
EDWARD H. KNIGHT,
JOHN A. WIEDERSHEIM.